(12) United States Patent
Lee et al.

(10) Patent No.: US 8,157,429 B2
(45) Date of Patent: Apr. 17, 2012

(54) OPTICAL SHEET HAVING OFFSET CONDENSING AND REFLECTING ELEMENTS AND DISPLAY DEVICE HAVING THE SAME

(75) Inventors: Sang-Hoon Lee, Cheonan-si (KR); Byung-Yun Joo, Seoul (KR); Min-Young Song, Seoul (KR); Jin-Sung Choi, Yongin-si (KR); Seung-Hwan Chung, Anyang-si (KR); Dong-Kwan Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 488 days.

(21) Appl. No.: 12/317,937

(22) Filed: Dec. 31, 2008

(65) Prior Publication Data
US 2009/0168452 A1    Jul. 2, 2009

(30) Foreign Application Priority Data

Dec. 31, 2007  (KR) ................ 10-2007-0141501
Oct. 27, 2008  (KR) ................ 10-2008-0105265

(51) Int. Cl.
*F21V 5/02*     (2006.01)
*F21V 7/09*     (2006.01)

(52) U.S. Cl. ........ 362/606; 362/292; 362/333; 362/339; 349/64

(58) Field of Classification Search .................. 362/606, 362/617, 627, 217.02, 217.03, 290, 292, 362/330, 333, 339; 349/62, 64
See application file for complete search history.

(56) References Cited

U.S. PATENT DOCUMENTS

| | | |
|---|---|---|
| 2005/0007513 A1 | 1/2005 | Lee et al. |
| 2005/0024554 A1 | 2/2005 | Lee et al. |
| 2006/0285312 A1 | 12/2006 | Ogawa et al. |

FOREIGN PATENT DOCUMENTS

| | | |
|---|---|---|
| CN | 1530713 | 9/2004 |
| CN | 1885129 | 12/2006 |
| CN | 1936421 | 3/2007 |
| EP | 0372525 A2 | 6/1990 |
| JP | 2000-284268 A | 10/2000 |
| JP | 2006-276621 A | 10/2006 |
| JP | 2006-313360 A | 11/2006 |
| JP | 2006-330032 A | 12/2006 |
| JP | 2006-351485 A | 12/2006 |

OTHER PUBLICATIONS

EP Search Report, EP 08021486.9-2205, Mar. 29, 2010, 9 pages.
EP Search Report, EP 08021983.5-2205, Mar. 29, 2010, 9 pages.

*Primary Examiner* — Ismael Negron
(74) *Attorney, Agent, or Firm* — Innovation Counsel LLP (57) ABSTRACT

An optical sheet includes a base layer, a light-condensing layer and a plurality of light-reflecting portions. The light-condensing layer includes a plurality of light-condensing portions formed on a second surface of the base layer along a first direction extending from a first side surface to a second side surface perpendicular to the first side surface. The light-condensing portions extended in a second direction crossing the first direction at an angle with respect to the side surface. The light-reflecting portions are formed in the first surface along the second direction and corresponding to a plurality of recesses where the light-condensing portions meet each other. The center of the light-reflecting portion is off set from the recesses along the first direction.

20 Claims, 10 Drawing Sheets
(1 of 10 Drawing Sheet(s) Filed in Color)

OPTICAL SHEET HAVING OFFSET CONDENSING AND REFLECTING ELEMENTS AND DISPLAY DEVICE HAVING THE SAME

PRIORITY STATEMENT

This application claims priority under 35 U.S.C. §119 to Korean Patent Application No. 2007-141501, filed on Dec. 31, 2007, and Korean Patent Application No. 2008-105265, filed on Oct. 27, 2008 in the Korean Intellectual Property Office (KIPO), the contents of each are herein incorporated by reference in their entireties.

The patent or application file contains at least one drawing executed in color. Copies of this patent or patent application publication with color drawings will be provided by the U.S. Patent and Trademark Office upon request and payment of the necessary fee.

BACKGROUND OF THE INVENTION

1. Field of the Invention

Example embodiments of the present invention relate to an optical sheet and a display device having the optical sheet. More particularly, example embodiments of the present invention relate to an optical sheet which controls backlight quality in a flat panel display device, and a display device having the optical sheet.

2. Description of the Related Art

Generally, a liquid crystal display (LCD) is a non-emissive type display device, and thus the LCD device requires a light source such as a backlight device to supply an LCD panel of the LCD device with light.

The backlight assembly may be classified as either an edge illumination type backlight assembly or a direct illumination type backlight assembly. In the edge illumination type backlight assembly, a light source such as a cold cathode fluorescent lamp (CCFL) is disposed adjacent to a side edge surface of a light-guide plate (LGP). In the direct illumination type backlight assembly, a plurality of light sources is disposed at the back of the LCD panel.

The backlight assembly includes a plurality of optical sheets that enhance optical characteristics of light exiting from the light source. The optical sheet may include a diffusion sheet that diffuses light, a prism sheet that condenses the diffused light toward a front direction, and a protective sheet that protects the prism sheet, etc.

In order to improve luminance uniformity and general luminance levels, additional diffusion sheets, prism sheets, and/or reflective polarizing sheets, etc., may be used in the display device. However, the additional sheets may cause a cost increase for manufacturing the backlight assembly. As such, it is desirable to improve luminance without additional costs due to the extra sheets. In order to decrease the number of optical sheets the diffusion sheet and the prism sheet are replaced with one optical sheet. In this regard, the one optical sheet should have functions of both the diffusion sheet and the prism sheet.

Moreover, the one optical sheet should not decrease display quality, as may be the case with multiple optical sheets. Particularly, the one optical sheet should satisfy certain visibility conditions, such as luminance and contrast ratio characteristics of the display screen, TCO'03 conditions, etc. (TCO stems from the Swedish language and stands for "Tjänstemännens Centralorganisation," and the English translation is the "Swedish Confederation of Professional Employees.") For example, a TCO'03 condition may represent required conditions in which a luminance ratio should be no more than 1.7 at two edges of the display panel when the luminance of the edges of the display panel is observed from a predetermined viewing angle.

As described above, there are various technologies that use one optical sheet having multiple functions. For example, the multifunction optical sheet includes a transparent film, a plurality of prism patterns or a plurality of lenses formed on an upper surface of the transparent film, and a plurality of diffusion beads formed under a lower surface of the transparent film. In another example, the multifunction optical sheet includes a plurality of transparent layers having refractive indexes that are different from each other. In still another example, the multifunction optical sheet includes a diffusing layer having air bubbles formed therein.

However, the multifunction optical sheet developed in accordance with conventional technology may not fully satisfy required display conditions that are achieved by a plurality of optical sheets. Particularly, the conventional multifunction optical sheet may not include a structure for satisfying visibility conditions of a display panel, such as the TCP'03 conditions.

Thus, a need exists for an optical sheet having multiple functions capable of replacing optical sheets used for a display device that satisfies display quality conditions such as luminance, contrast ratio, and TCO'03 conditions required by the display device.

SUMMARY OF THE INVENTION

Example embodiments of the present invention provide an optical sheet that satisfies display quality conditions by diffusing and condensing light.

Example embodiments of the present invention provide a display device having the above-mentioned optical sheet.

According to one embodiment of the present invention, an optical sheet includes a base layer, a light-condensing layer, and a plurality of light-reflecting portions. The base layer includes a first surface, and a second surface opposite the first surface. The light-condensing layer includes a plurality of light-condensing portions formed on the second surface along a first direction crossing a longitudinal side and a vertical side that meet each other at the second surface. The light-condensing portions are extended in a second direction crossing the first direction to be tilted with respect to the longitudinal side and the vertical side of the optical sheet. The light-reflecting portions are formed in the first surface to correspond with a plurality of recesses where the light-condensing portions meet each other to be formed in the second direction. The center of the light-reflecting portion is spaced apart from the recess in the first direction regardless of position on the first surface.

In another embodiment of the present invention, the optical sheet may have a rectangular shape. The light-condensing portions and the light-reflecting portions may be extended along the second direction to be formed as a stripe-type structure. An interval distance between the recesses to the center of the light-reflecting portion along the first direction may be substantially uniform. The light-condensing portions and the light-reflecting portions may be formed with substantially the same pitch along the first direction.

According to still another embodiment of the present invention, a display device includes a light-guide plate (LGP), a light source, an optical sheet and a display panel. The LGP includes a light-exiting surface, an opposite surface facing the light-exiting surface, and a plurality of side surfaces connecting to the light-exiting surface and the opposite surface. The light source is disposed adjacent to at least one of the side surfaces. The optical sheet includes a base layer, a light-condensing layer, and a plurality of light-reflecting portions. The base layer includes a first surface, and a second surface opposite the first surface. The light-condensing layer includes a plurality of light-condensing portions formed on the second surface along a first direction crossing a longitudinal side and a vertical side that meet each other at the second surface. The light-condensing portions are extended in a second direction crossing the first direction to be tilted with respect to the longitudinal side and the vertical side. The light-reflecting portions are formed in the first surface in correspondence with a plurality of recesses where the light-condensing portions meet each other to be formed in the second direction. The center of the light-reflecting portion is spaced apart from the recess in the first direction regardless of position on the first surface. The display panel is disposed to face the second surface of the optical sheet.

In another embodiment of the present invention, the first direction may be defined as a direction toward the upper right corner of the optical sheet from the lower left corner of the optical sheet, and the centers of the light-reflecting portions may be misaligned from the recess to the upper right side of the optical sheet regardless of position on the first surface, when viewed from the front of the display panel. The light source may include a lamp tube, a cold electrode, and a hot electrode. The lamp tube may be disposed adjacent to at least one of a lower side surface of the LGP corresponding to the longitudinal side and an upper side surface of the LGP facing the lower side surface. The cold electrode may be disposed at a left side edge of the lamp tube. The hot electrode may be disposed at a right side edge of the lamp tube. The optical sheet may deflect light that is emitted from the lamp tube incident at the upper right side area of the second surface to the lower left side to uniformize the luminance of light exiting from the optical sheet. The light-condensing portions and the light-reflecting portions may be formed with substantially the same pitch along the first direction, and an interval distance between the recess and the center of the light-reflecting portion may be uniform along the first direction. The light-condensing portions and the light-reflecting portions may be formed with substantially the same pitch along the first direction. An interval distance between the recess and the center of the light-reflecting portion may be increased along the first direction.

In an embodiment of the present invention, the first direction and the second direction may be crossed with an arrangement direction of pixels of the display panel to prevent moiré from being generated on the display panel. One optical sheet may be disposed between the light-exiting surface of the LGP and the display panel to enhance luminance uniformity and the front luminance of light exiting from the light-exiting surface. A plurality of line prisms extended substantially in parallel with the first direction may be formed on the opposite surface.

According to various embodiments of an optical sheet and a display device having the optical sheet, a display device includes one optical sheet according to the present invention, so that a plurality of optical sheets such as a diffusion sheet and a light-condensing sheet may be omitted. The optical sheet is disposed on an LGP to enhance optical characteristics of light exiting from the LGP. The optical sheet may satisfy viewing angle characteristics such as front luminance and contrast ratio characteristics and TCO'03 conditions. Therefore, display quality may not be decreased, and the number of the optical sheets that are used for the display device may be reduced.

BRIEF DESCRIPTION OF THE DRAWINGS

This patent or application file contains at least one drawing executed in color. Copies of this patent or patent application publication with color drawings(s) will be provided by the Office upon request and payment of the necessary fee.

The above and other features and advantages of the present invention will become more apparent by describing in detailed example embodiments thereof with reference to the accompanying drawings, in which.

DETAILED DESCRIPTION OF THE INVENTION

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
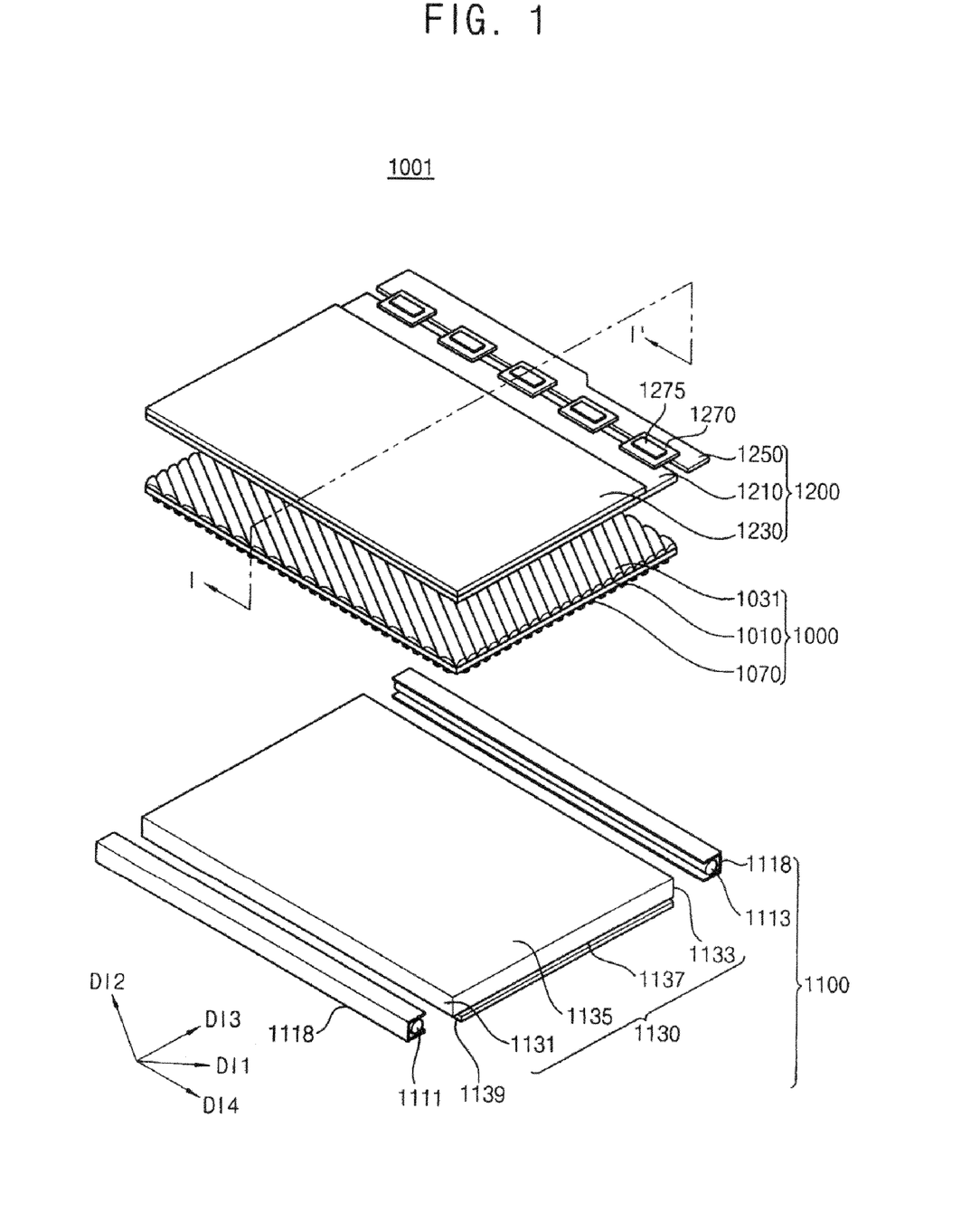
FIG. 1 is a perspective view illustrating a display device according to an embodiment of the present invention.
Figure 2:
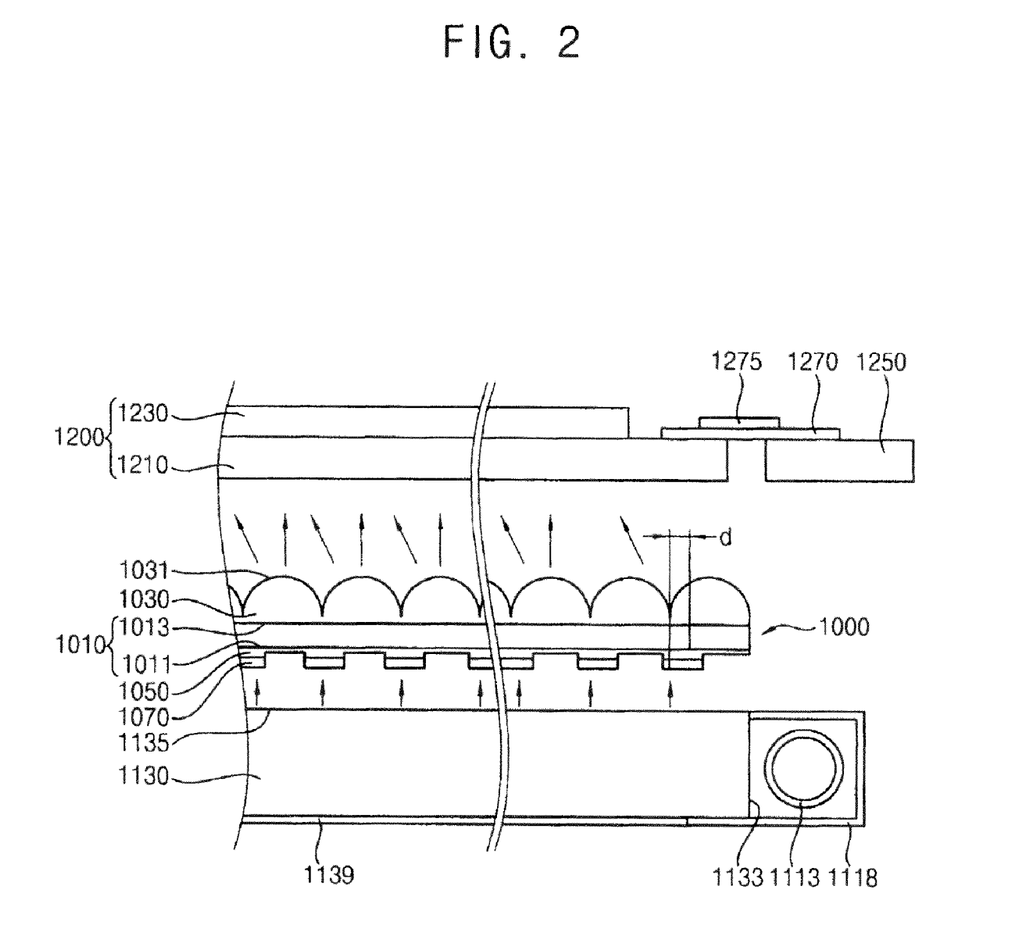
FIG. 2 is a cross-sectional view taken along a line I-I' of the display device shown in FIG. 1.

FIG. 1 is a perspective view illustrating a display device 1001 according to an embodiment of the present invention. FIG. 2 is a cross-sectional view taken along a line I-I' of the display device 1001 shown in FIG. 1.

Referring to FIGS. 1 and 2, the display device 1001 according to the present embodiment includes a light-guide plate (LGP) 1130, a light source, an optical sheet 1000 and a display panel 1200.

The LGP 1130 includes a light-exiting surface 1135 and an opposite surface 1137 that face each other. Side surfaces connect the light-exiting surface 1135 and the opposite surface 1137. The LGP 1130 may include an optical diffusion-guiding structure. The LGP 1130 may have a substantially rectangular shape. Thus, the light-exiting surface 1135 may include a longitudinal side and a vertical side substantially perpendicular to the longitudinal side.

An extending direction of the vertical side and an extending direction of the longitudinal side may be defined as a vertical direction DI3 and a longitudinal direction DI4, respectively. A side surface parallel with the vertical direction DI3 is defined as a vertical side surface, and a side surface parallel with the longitudinal direction DI4 is defined as longitudinal side surfaces 1131 and 1133. Thus, the LGP 1130 includes two longitudinal side surfaces 1131 and 1133.

The display device 1001 may stand upright so that the normal line of the light-exiting surface is perpendicular to the direction of gravity, which is different from FIG. 1. When the display device 1001 stands upright, a portion close to the ground may be defined as a lower side and a portion relatively farther from the ground than the lower side may be defined as an upper side. Thus, one of the longitudinal side surfaces 1131 and 1133 of the LGP 1130 may be a lower side surface 1131, and the remaining side may be an upper side surface 1133.

The light source may emit light that is used to display images. The light source is disposed adjacent to at least one of the lower side surface 1131 of the LGP 1130 and the upper side surface 1133. In the present embodiment, the light source includes a first lamp 1111 disposed adjacent to the lower side surface 1131 and a second lamp 1113 disposed adjacent to the upper side surface 1133. Alternatively, the light source may include a point light source such as a light-emitting diode (LED).

Each of the first and second lamps 1111 and 1113 may include a lamp tube, a cold electrode, and a hot electrode. The cold electrode is disposed at a left side edge of the lamp tube, and the hot electrode is disposed at a right side edge of the lamp tube. Here, the right side represents the vertical direction DI3, and the left side represents the opposite direction to the vertical direction DI3. A lamp driving voltage of a high voltage is applied to the hot electrode. The cold electrode may be grounded. Thus, when light is generated from the lamp tube, a large amount of heat may be generated from the hot electrode.

The temperature of a right side of the display device 1001 may be higher than the temperature of a left side of the display device 1001 due to heat generated from the hot electrodes of the first and second lamps 1111 and 1113. Moreover, when the display device 1001 stands upright to be used, the temperature of an upper side of the display device 1001 may be higher than the temperature of a lower side of the display device 1001 due to air convection in the interior of the display device 1001.

The display device 1001 may further include a plurality of lamp reflectors 1115. The lamp reflectors 1115 are disposed to surround the first and second lamps 1111 and 1113 to reflect light toward the lower side surface 1131 and the upper side surface 1133. The display device 1001 may further include a reflective sheet 1139 disposed at an opposite surface 1137 of the LGP 1130 to reflect leakage light back to the opposite surface 1137.

Light emitted from the first and second lamps 1111 and 1113 incident to the LGP 1130 is changed to a surface light type by the LGP 1130 to exit from the light-exiting surface 1135.

The optical sheet 1000 diffuses and condenses light exiting from the light-exiting surface 1135 to enhance luminance uniformity and front luminance. The optical sheet 1000 is disposed between the LGP 1130 and the display panel 1200.

The display panel 1200 is disposed on the optical sheet 1000 to display images based on light exiting from the optical sheet 1000. The display panel 1200 may include a lower substrate 1210, an upper substrate 1230 and a liquid crystal layer. The lower substrate 1210 may include a plurality of pixels arranged in a matrix shape. The pixels may be arranged in the vertical direction DI3 and the longitudinal direction DI4. The upper substrate 1230 is facing the lower substrate 1210. The upper substrate 1230 may include a common electrode facing the pixels. The liquid crystal layer is interposed between the lower substrate 1210 and the upper substrate 1230. The display device 1001 may further include a driving substrate 1250 providing a driving signal which drives the pixels, a connection film 1270 connecting the driving substrate 1250 and the lower substrate 1210, and a driving chip 1275.

As described above, while the display device 1001 is operated, the temperature of upper and right sides of the display device 1001 may be higher than that of lower and left sides of the display device 1001. Thus, a luminance corresponding to upper and right sides of the display panel 1200 may be higher than a luminance corresponding to lower and left sides of the display panel 1200. Moreover, in the first and second lamps 1111 and 1113, a luminance corresponding to a side close to the hot electrode is higher than a luminance corresponding to a side close to the cold electrode, so that a luminance disproportion may be higher. Therefore, when the display panel 1200 is viewed, display quality characteristics, such as contrast ratio and side visibility, may be deteriorated.

In the present embodiment, the optical sheet 1000 deflects light exiting from the LGP 1130 toward the lower left side of the display panel 1200 to enhance the display quality. Here, the deflection refers to changing a path of light to the lower left side with respect to the normal line direction of the light-exiting surface 1135.

Figure 3:
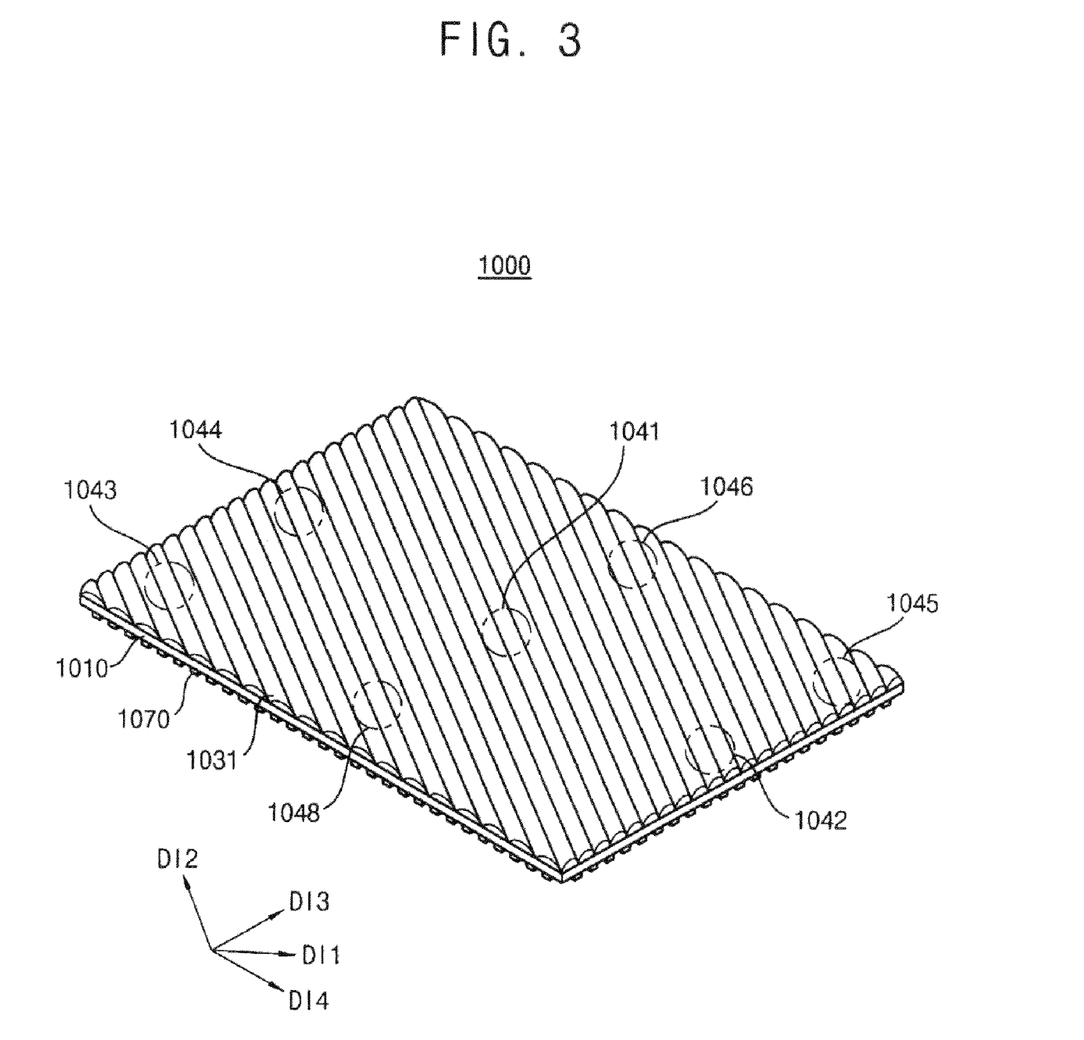
FIG. 3 is a perspective view illustrating the optical sheet of FIG. 1.
Figure 4:
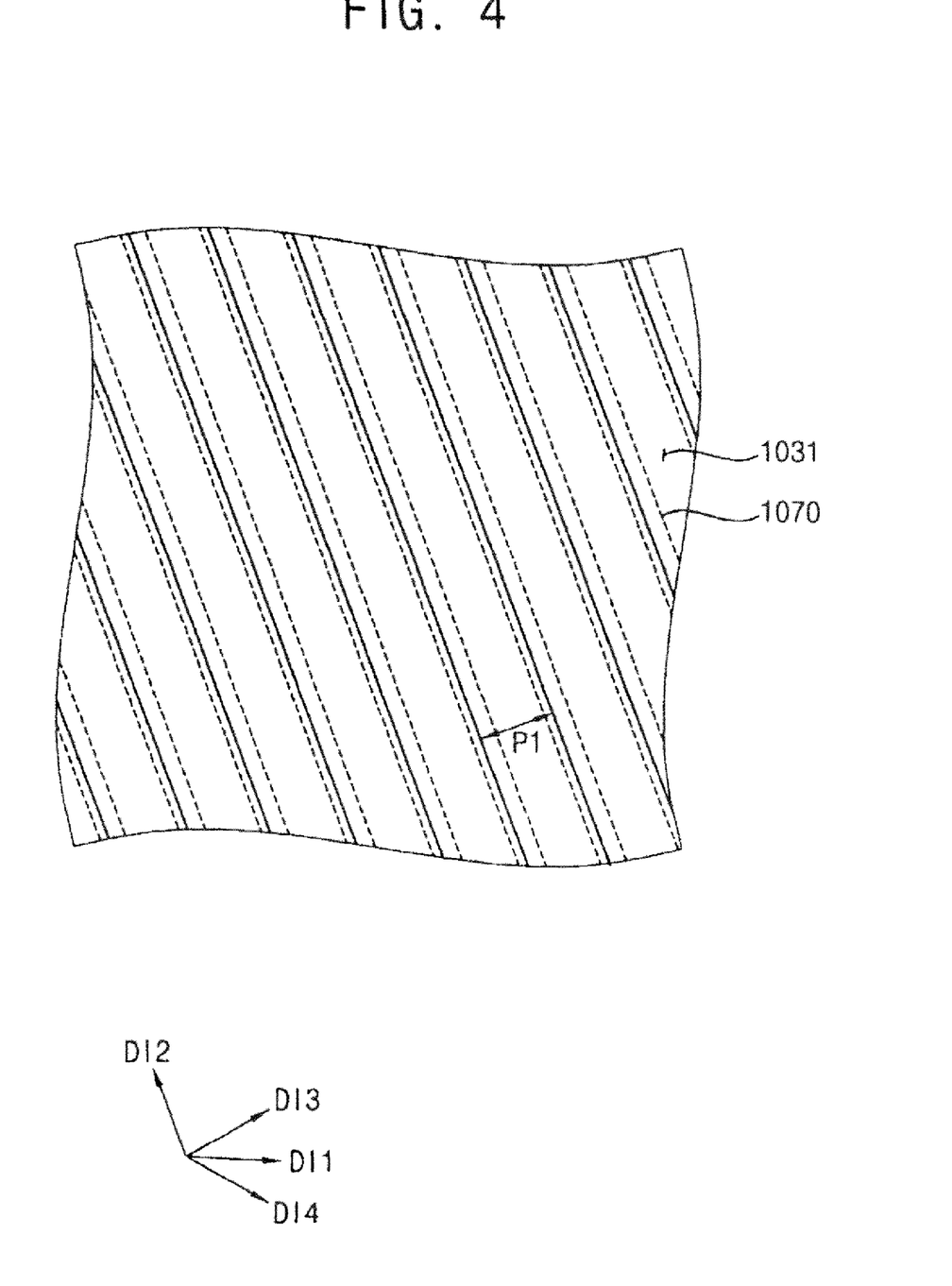
FIG. 4 is a partial plan view illustrating the optical sheet of FIG. 3.
Figure 5:
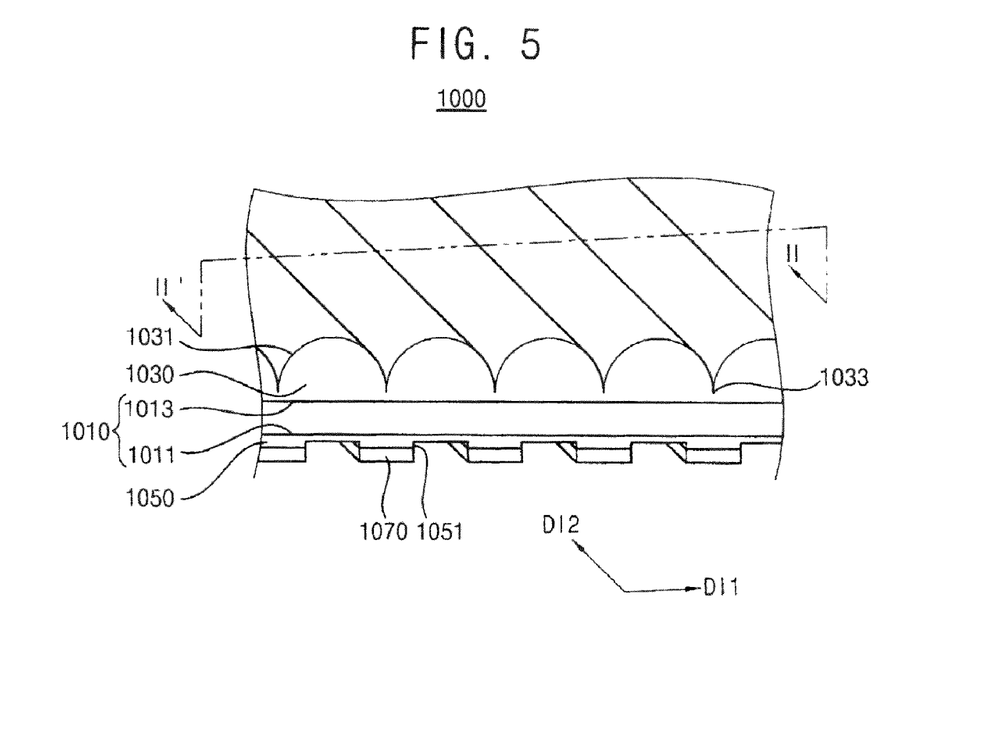
FIG. 5 is an enlarged perspective view illustrating the optical sheet of FIG. 3.

FIG. 3 is a perspective view illustrating the optical sheet 1000 of FIG. 1. FIG. 4 is a partial plan view illustrating the optical sheet 1000 of FIG. 3. FIG. 5 is an enlarged perspective view illustrating the optical sheet 1000 of FIG. 3.

Referring to FIGS. 1, 3, 4, and 5, the optical sheet 1000 includes a base layer 1010, a light-condensing layer 1030, and a plurality of light-reflecting portions 1070.

The base layer 1010 includes a first surface 1011 facing the light-exiting surface 1135 and a second surface 1013 opposite the first surface 1011. The base layer 1010 may have a thickness of a few hundred micrometers.

The base layer 1010 may include an optical diffusion-guiding structure that has excellent light transmittance, heat resistance, chemical resistance, mechanical strength, etc. The base layer 1010 includes, for example, polyethylene terephthalate (PET), polyethylene naphthalate (PEN), co-polyethylene terephthalate (co-PET), co-polyethylene naphthalate (co-PEN) and glass. The base layer 1010 may include a polyethylene terephthalate (PET) layer, a polyethylene naphthalate (PEN) layer, a co-polyethylene terephthalate (co-PET) layer, a co-polyethylene naphthalate (co-PEN) layer and a glass layer. The optical diffusion conductive structure may include polymethyl methacrylate, polyamide, polyimide, polypropylene, polyurethane, etc.

The light-condensing layer 1030 is formed on the second surface 1013 of the base layer 1010. The light-condensing layer 1030 includes a plurality of light-condensing portions 1031. The light-condensing portions 1031 may condense light that is incident from the first surface 1011 and transmitted through the second surface 1013. Here, the light-condensing refers to changing a light path to be adjacent to a normal line direction of the second surface 1013.

The light-condensing portions 1031 may include the same material as that of the base layer 1010 or material that is different from that of the base layer 1010. In order to provide a boundary surface from which light is refracted, the light-condensing layer 1030 may include a material that is different from that of the base layer 1010. The refractive index of the light-condensing layer 1030 may be greater than that of the base layer 1010. As shown in FIG. 5, a refractive angle of light that is incident from the first surface 1011 to the second surface 1013 is substantially smaller than an incident angle of the light. Thus, the light may be effectively condensed by the light-condensing portions 1031.

Figure 6:
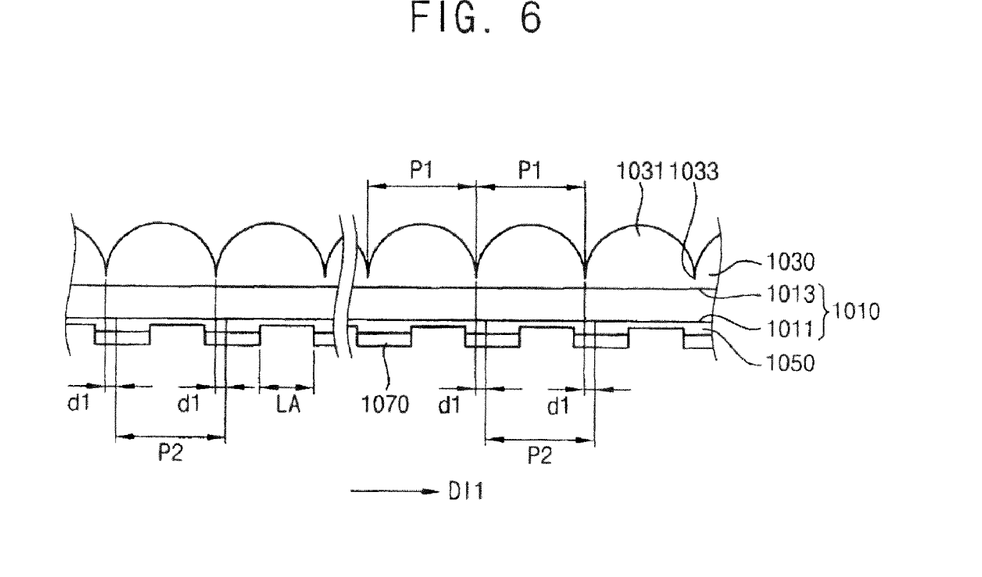
FIG. 6 is a cross-sectional view taken along a line II-II' of the optical sheet of FIG. 5.

The light-condensing portions 1031 may be formed with a first pitch P1 on the second surface 1013 along a first direction DI1, as shown in FIGS. 3, 4, and 6. Here, the first direction DI1 is defined as a direction that crosses the vertical direction DI3 and the longitudinal direction DI4 at acute angles. In the present embodiment, the first direction DI1 may be in parallel with a first diagonal line direction that crosses the vertical direction DI3 and the longitudinal direction DI4 at acute angles. The first diagonal line direction is defined as one diagonal line of the second surface 1013, which is from the lower left side to the upper right side of the optical sheet 1000. The first pitch P1 may have a size of a few hundred micrometers. The light-condensing portions 1031 are extended along a second direction DI2 crossing the first direction DI1 to form a stripe-type structure. The second direction DI2 may be substantially in parallel with a second diagonal line direction. The second diagonal line direction is defined as another diagonal line of the second surface 1013, which is from a lower right side to an upper left side of the optical sheet 1000. Thus, the second direction DI2 crosses with the vertical direction DI3 and the longitudinal direction DI4. The light-condensing portions 1031 meet each other to form a plurality of recesses 1033 that are extended in the second direction DI2.

A surface of the light-condensing portion 1031 may have a profile that allows the light-condensing portion 1031 to perform the role of a light-condensing lens. For example, as shown in FIG. 5, when a cross-section of the light-condensing portion that is cut in parallel with the first direction DI1 is viewed, the light-condensing portion 1031 may have a lenticular shape.

The light-condensing layer 1030 may further include light dispersants such as diffusion beads. The light dispersant may not be visible to the naked eye. The light dispersant may be included inside the light-condensing portion 1031.

The optical sheet 1000 may further include a concavo-convex pattern layer 1050.

The concavo-convex pattern layer 1050 is formed on the first surface 1011 of the base layer 1010. The concavo-convex pattern layer 1050 may include a material that is different from that of the base layer 1010. The refractive index of the concavo-convex pattern layer 1050 may be smaller than that of the base layer 1010.

The concavo-convex pattern layer 1050 may include a plurality of protruding portions 1051. The protruding portions 1051 are formed in correspondence with the plurality of recesses 1033 forming the light-condensing portions 1031. The protruding portions 1051 may provide an area where the light-reflecting portions 1070 (which will be described later) are formed. The concavo-convex pattern layer 1050 may further include light dispersants such as diffusing beads.

FIG. 6 is a cross-sectional view taken along a line II-II' of the optical sheet 1000 of FIG. 5. In FIG. 5, the line II-II' is parallel with the direction DI1.

Referring to FIGS. 4, 5, and 6, the light-reflecting portions 1070 reflect incident light. The light-reflecting portions 1070 are formed on the protruding portions 1051. Thus, the light-reflecting portions 1070 extend in the second direction DI2 corresponding to the recesses 1033. In the present embodiment, the light-reflecting portions 1070 are formed with a second pitch P2 along the first direction DI1. In the present embodiment, the second pitch P2 is substantially equal to the first pitch P1 where the light-condensing portions 1031 are disposed. An area between the light-reflecting portions 1070 may be defined as a transmissive area LA.

Light that is incident toward the first surface 1011 is incident into the base layer 1010 through the concavo-convex pattern layer 1050 corresponding to the transmissive area LA. The light that is incident into the light-reflecting portion 1070 may be reflected no more than about 90%.

Light reflected by the light-reflecting portion 1070 may be reflected by the LGP 1130 or the reflective sheet 1139 to be incident to the transmissive area LA. Thus, light reflected by the light-reflecting portion 1070 is incident to the transmissive area LA through a repeat of the reflection, so that the reflected light may be effectively used.

As shown in FIGS. 4 and 6, the center of the light-reflecting portion 1070 does not match with the recess 1033. The center of the light-reflecting portion 1070 is spaced apart from the recess 1033 in the first direction DI1 at a uniform distance, for example, about 10 μm, on the first surface 1011. That is, the center of the light-reflecting portion 1070 crosses the recess 1033 along the first direction DI1, for example, from the lower left side to the upper right side of the optical sheet 1000, regardless of position on the first surface 1011. A mismatch between the recess 1033 and the center of the light-reflecting portion 1070 is defined as a misalignment 'd1'. In the present embodiment, misalignment amounts are uniform regardless of position. Alternatively, the light-reflecting portions 1070 may be formed so that misalignment amounts are increased along the first direction DI1.

In the present embodiment, line widths of the light-reflecting portion 1070 are uniform. Thus, the width of the transmissive area LA may be uniform regardless of position. As centers of the light-reflecting portions 1070 are crossed with the recess 1033, the center of the transmissive area LA is deflected from the center of the light-condensing portion 1031 toward the upper right side throughout the entire first surface 1011. Alternatively, the line width of the light-reflecting portion 1070 may be decreased along the first direction DI1. In this case, the width of the transmissive area LA may be increased along the first direction DI1.

Figure 7A:
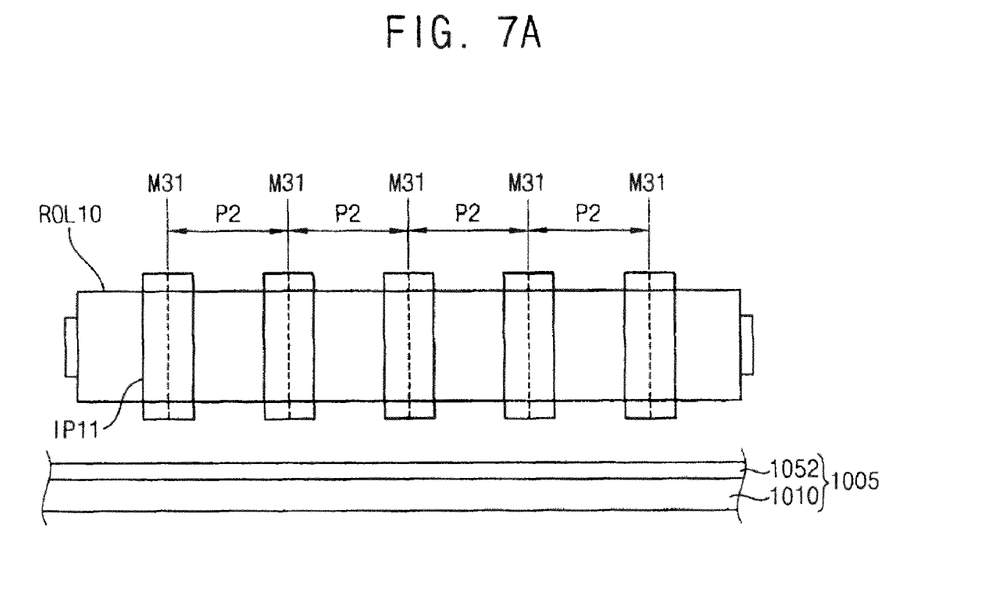
FIGS. 7A and 7B are cross-sectional views illustrating a method of manufacturing the optical sheet of FIG. 6.
Figure 7B:
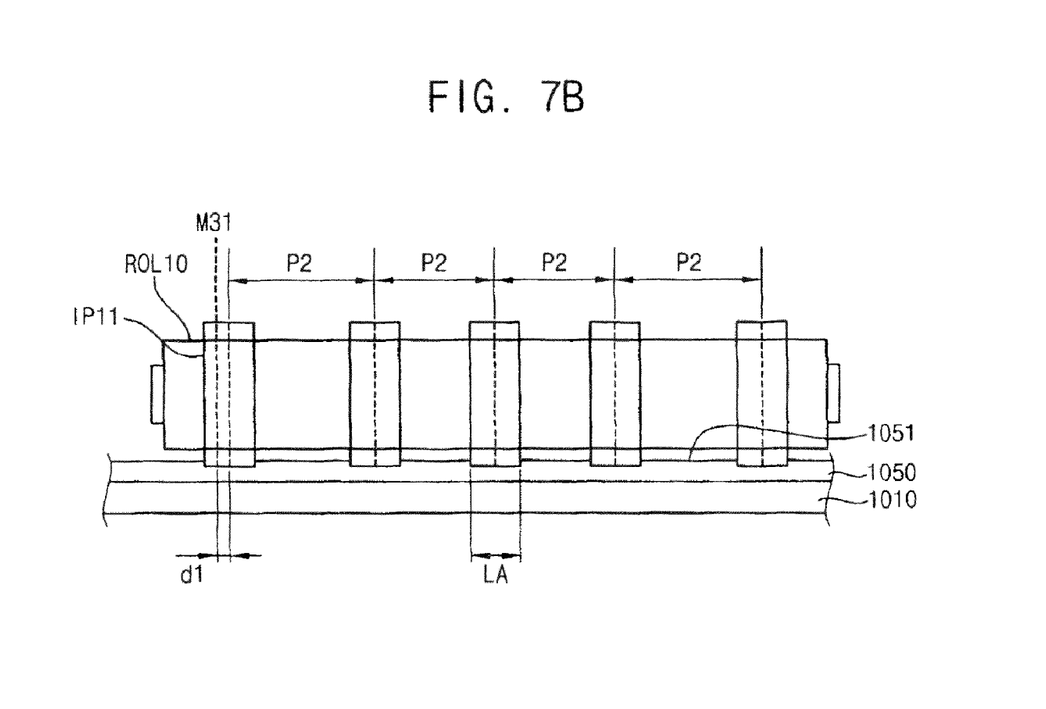

FIGS. 7A and 7B are cross-sectional views illustrating a method of manufacturing the optical sheet 1000 of FIG. 6.

An optical sheet 1000 according to the present embodiment may be manufactured through a printing method in which a resin layer is printed using a roller ROL10. As shown in FIG. 7A, a roller ROL10 is positioned on a base sheet 1005. A plurality of printing portions IP11 for forming the concavo-convex pattern layer is formed on the roller ROL10. The base sheet 1005 includes the base layer 1010 and a resin layer 1052 formed on the first surface 1011 of the base layer 1010. The printing portion IP11 may be precisely arranged in an area where the light-condensing portions 1031 are to be formed.

Then, the roller ROL10 or the base sheet 1005 is moved, as shown in FIG. 7B, to be misaligned by the predetermined distance d1 from the center of an area where the light-condensing portions 1031 are to be formed by the printing portions IP11. Then, the resin layer 1052 is pressed by the printing portion IP11 to form the protruding portion 1051 as a resin layer 1052 between the printing portions IP11. Thus, the resin layer 1052 may be formed as the concavo-convex pattern 1050.

Then, a metal or another reflective material is deposited on an upper surface of the protruding portions 1051 to form the light-reflecting portions 1070. Then, the light-condensing layer 1030 is formed on the second surface 1013 of the base layer 1010 to manufacture the optical sheet 1000. When the optical sheet 1000 is manufactured through the method, a process of misaligning from the center of an area in which the light-condensing portions 1031 are to be formed may be finely and easily performed through the printing portions IP11 of the roller ROL10 as described above. Thus, a light control function of the optical sheet 1000 may be uniform according to position, so that the quality of the optical sheet 1000 may be enhanced.

Figure 8:
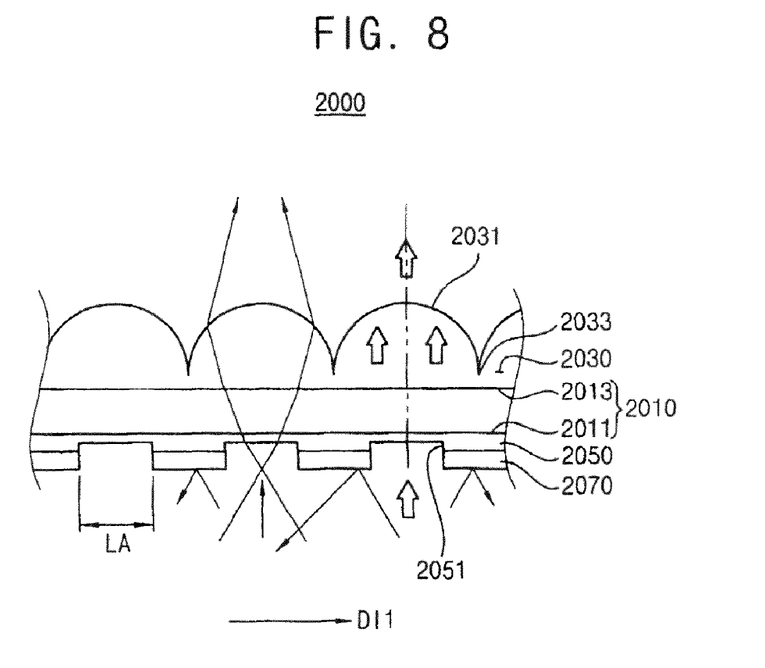
FIG. 8 is a cross-sectional view illustrating a conventional optical sheet in which a misalignment is not formed between a light-condensing portion and a light-reflecting portion.
Figure 9:
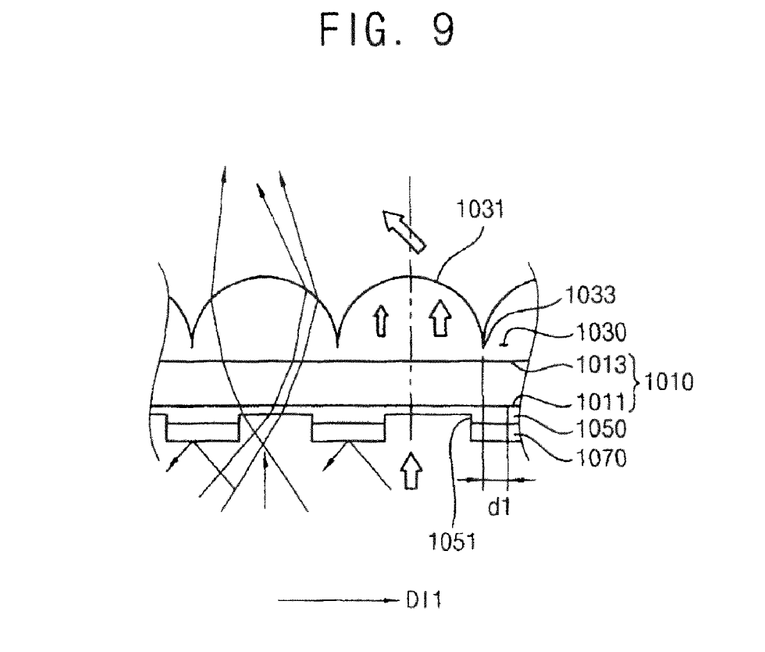
FIG. 9 is an enlarged cross-sectional view illustrating the optical sheet of FIG. 6.

FIG. 8 is a cross-sectional view illustrating a conventional optical sheet in which a misalignment is not formed between a light-condensing portion 2031 and a light-reflecting portion 2070. FIG. 9 is an enlarged cross-sectional view illustrating the optical sheet 1000 of FIG. 6.

Referring to FIG. 8, in a conventional optical sheet in which a misalignment is not formed between the light-condensing portion 2031 and the light-reflecting portion 2070, the center of the transmissive area LA may correspond to the center of the light-condensing portion 2031. Thus, a conventional optical sheet 2000 may condense incident light to a normal line direction of a second surface 2013 regardless of position. Thus, when light incident to a first surface 2011 of the conventional optical sheet 2000 is condensed at the upper right side area, the luminance of light exiting from the conventional optical sheet 2000 is higher than a luminance corresponding to the upper right side area. Therefore, the uniformity of luminance corresponding to the conventional optical sheet 2000 may be lower when a luminance disproportion of incident light is high.

Referring to FIG. 9, the transmissive area LA is misaligned from the center of the light-condensing portion 1031 toward the upper right side in the optical sheet 1000 of the present embodiment, which is different from the conventional optical sheet 2000. Thus, as shown in FIG. 9, a large amount of light emitted from the light-condensing portion 1031 is deflected toward the opposite direction to the first direction DI1, that is, the lower left side. Thus, even though incident light is deflected to the upper right side area, the luminance uniformity of light emitted from the optical sheet 1000 may be more enhanced compared to that of the conventional optical sheet 2000.

Figure 10:
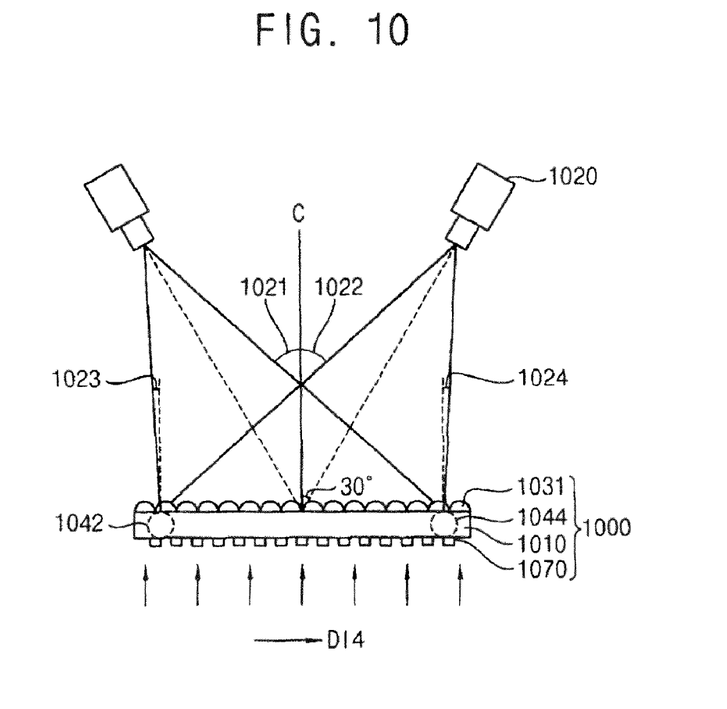
FIG. 10 is a schematic diagram illustrating a luminance observation method of edges of a longitudinal direction of the optical sheet of FIG. 9.
Figure 11:
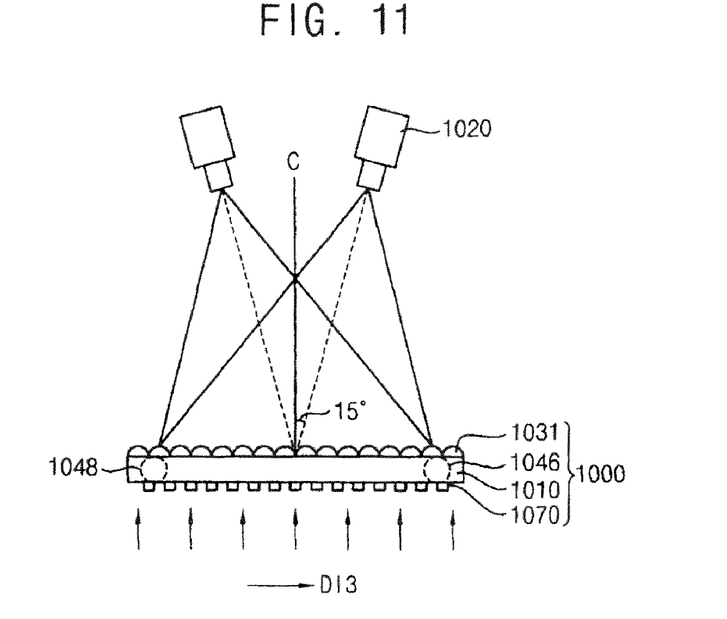
FIG. 11 is a schematic diagram illustrating a luminance observation method of edges of a vertical direction of the optical sheet of FIG. 9.

FIG. 10 is a schematic diagram illustrating a luminance observation method of edges 1042 and 1044 of a longitudinal direction DI4 of the optical sheet 1000 of FIG. 9. FIG. 11 is a schematic diagram illustrating a luminance observation method of edges 1046 and 1048 of a vertical direction DI3 of the optical sheet 1000 of FIG. 9.

Referring to FIGS. 3, 10, and 11, the optical sheet 1000 should satisfy optical characteristics required by the display device 1001. In the optical characteristics, the front luminance of exiting light should be higher than a required value, and conditions for a side viewing angle should be satisfied. The conditions for a side viewing angle may be TCO'03 conditions.

The TCO'03 conditions may represent required conditions in which a luminance ratio should be no more than 1.7 at two edges of the display panel when the luminance of the edges of the display panel is observed from a predetermined viewing angle.

A horizontal TCO'03 value (TCO L/H) may be defined as a luminance ratio of two edges of the longitudinal direction DI4, that is no less than 1.7 when a detection device 1020 toward the center of the optical sheet 1000 in a direction of about 30 degrees with respect to the normal line of the optical sheet 1000 as shown in FIG. 10.

A vertical TCO'03 value (TCO L/V) may be defined as a luminance ratio of two edges of the vertical direction DI3, that is no less than 1.7 when a detection device 1020 faces toward the center of the optical sheet 1000 in a direction of about 30 degrees with respect to the normal line of the optical sheet 1000 as shown in FIG. 11.

When the horizontal TCO'03 value (TCO L/H) and the vertical TCO'03 value (TCO L/V) exceed 1.7, visibility defects may be generated when a user views the display panel 1200 from a horizontal direction or a vertical direction.

Figure 12:
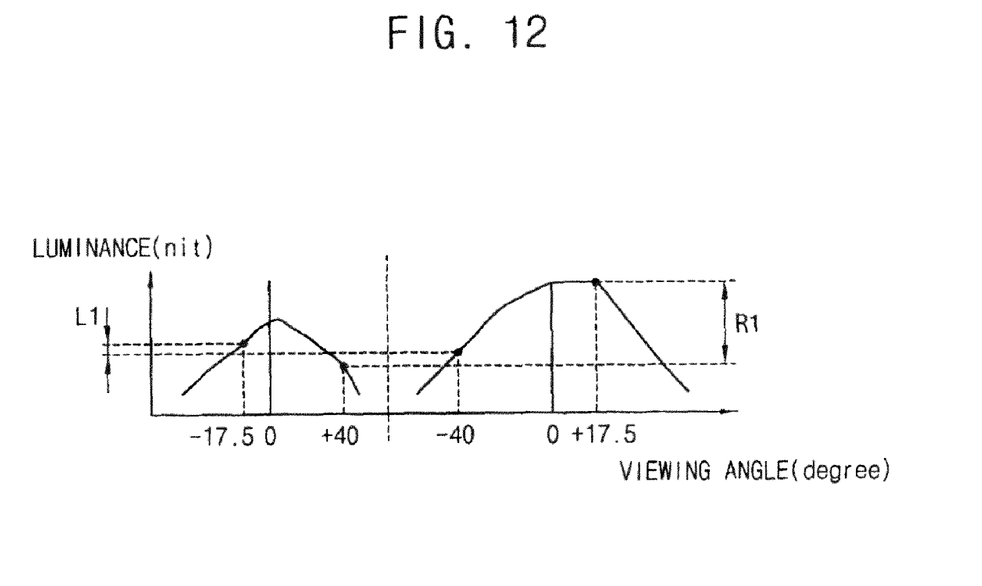
FIG. 12 is a graph illustrating the luminance of the conventional optical sheet of FIG. 8 in accordance with a luminance observation method described with reference to FIG. 10.

FIG. 12 is a graph illustrating the luminance of the conventional optical sheet 2000 of FIG. 8 in accordance with a luminance observation method described with reference to FIG. 10.

In FIG. 12, a longitudinal axis represents a viewing angle in which a normal line direction of the conventional optical sheet 2000 is about 0 degrees. A vertical axis represents a relative luminance level that is detected. The longitudinal axis is divided into two areas. A viewing angle characteristics curve of a left side edge of the conventional optical sheet 2000 is shown in a left area, and a viewing angle characteristics curve of a right side edge of the conventional optical sheet 2000 is shown in a right area.

Referring to FIG. 12, the luminance of the right side edge is higher than that of the left side edge in the conventional optical sheet 2000, as described above.

Referring to FIGS. 10 and 11, in a case of the conventional optical sheet 2000, luminance difference L1 between the left side edge and the right side edge which are detected at a left viewing angle is smaller than luminance difference R1 between the right side edge and the left side edge which are detected at a right viewing angle. In FIG. 12, the left viewing angle is shown as a negative viewing angle, and the right viewing angle is shown as a positive viewing angle. Thus, a value of R1/L1 may be high. That is, a disproportion of left and right viewing angle characteristics of the conventional optical sheet 2000 may be high. Therefore, the horizontal TCO'03 value (TCO L/H) is about 1.75, which is higher than about 1.7 that is the horizontal TCO'03 condition, and thus the horizontal TCO'03 condition may not be satisfied.

Figure 13:
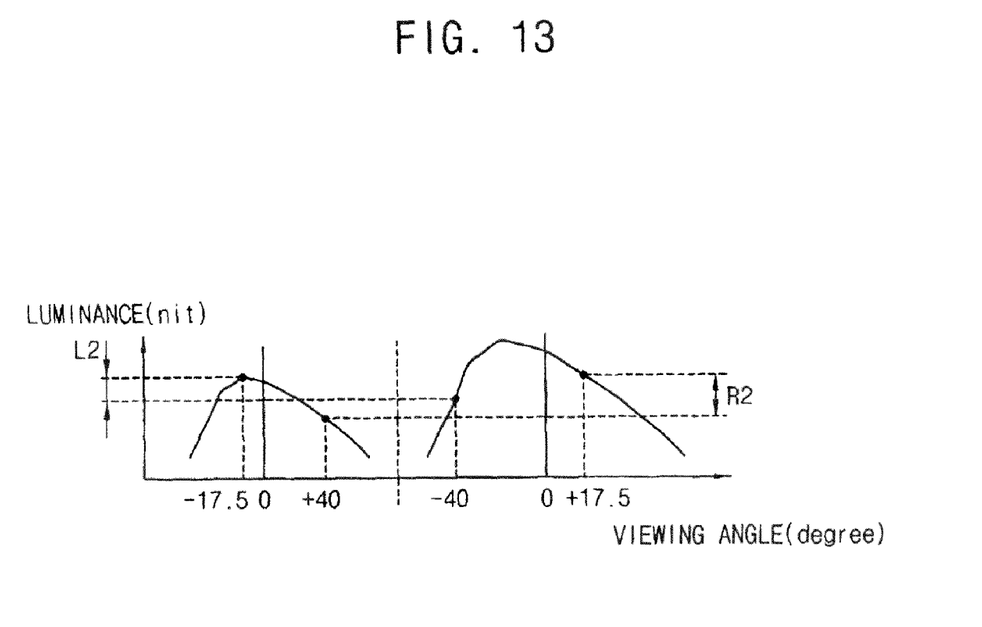
FIG. 13 is a graph illustrating the luminance of the optical sheet of FIG. 9 in accordance with a luminance observation method described with reference to FIG. 10.

FIG. 13 is a graph illustrating the luminance of the optical sheet 1000 of FIG. 9 in accordance with a luminance observation method described with reference to FIG. 10.

Referring to FIGS. 3, 10, 11 and 13, in the optical sheet 1000 of the present embodiment, the luminance of a left side edge 1042 is higher than the luminance of a right side edge 1044; however, a peak point of luminance is moved to a left side, because the center of the light-reflecting portion 1070 is misaligned from the recess to the upper right side of the optical sheet regardless of position on the optical sheet 1000, as described with reference to FIG. 9. Thus, light-exiting characteristics of the optical sheet 1000 as shown in FIG. 13 may improve visibility defects of the display device 1001.

Referring to FIGS. 10 and 13, in a case of the optical sheet 1000 of the present embodiment, a luminance difference L2 between the left side edge 1042 and the right side edge 1044 that is detected at a left viewing angle may be smaller than a luminance difference R2 between the right side edge 1044 and the left side edge 1042 that is detected at a right viewing angle. However, the luminance difference R2 may be smaller than the luminance difference R1 of the conventional optical sheet 2000 as described with reference to FIG. 12. That is, a value of R2/L2 may be smaller than a value of R1/L1, so that a disproportion between the left viewing angle characteristics and the right viewing angle characteristics is enhanced compared to that of the conventional optical sheet 2000. Accordingly, in a case of the present embodiment, the horizontal TCO'03 value (TCO L/H) may be about 1.56 and the vertical TCO'03 value (TCO L/V) may be about 1.41. That is, the optical sheet 1000 of the present embodiment may satisfy the horizontal and vertical TCO'03 conditions.

The optical sheet 1000 of the present embodiment deflects incident light toward the lower left side thereof so that the deflected light exits, so that an effect of which luminance disproportion and viewing angle disproportion are enhanced may be achieved.

Figure 14:
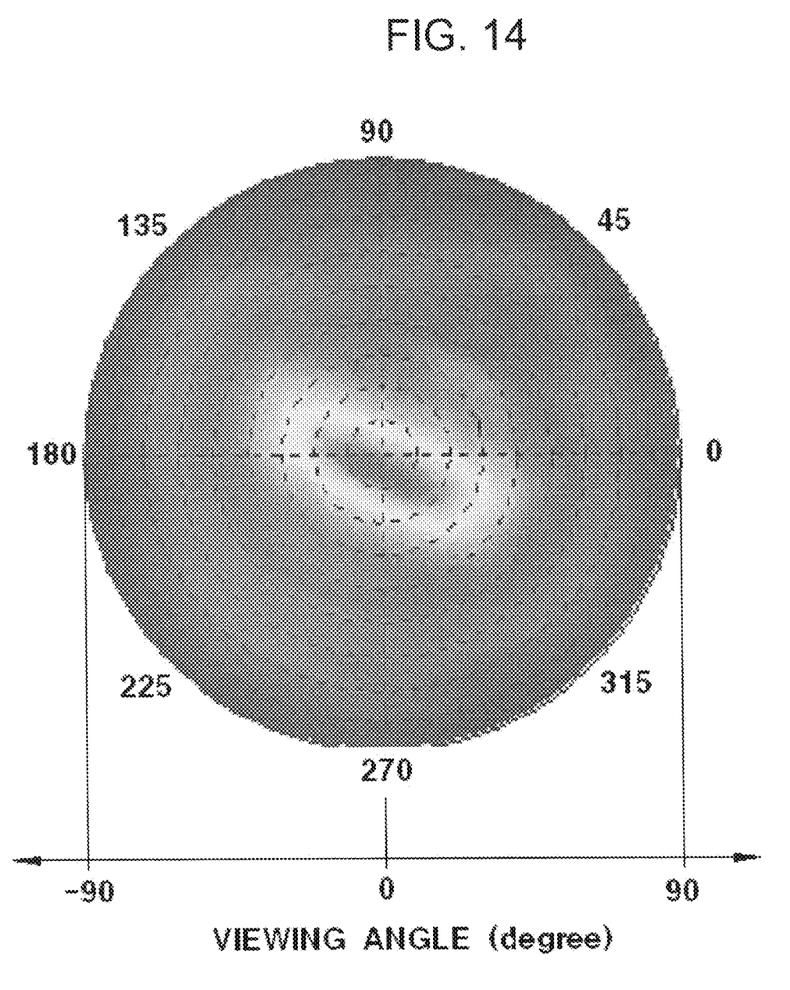
FIG. 14 is a graph of another type displaying luminance observation results of FIG. 13.

FIG. 14 is a graph of another type displaying luminance observation results of FIG. 13.

Referring to FIG. 14, the center of a circle shape graph corresponds to 0 degrees of a viewing angle, and a viewing angle varies from +90 degrees to −90 degrees from the center. Moreover, observation directions from which the optical sheet 1000 is observed are indicated along the circumference of the circle shape graph. A direction of zero degrees corresponds to the longitudinal direction DI4, and a direction of 90 degrees corresponds to the vertical direction DI3. Thus, the lower left side direction corresponds to a direction of 225 degrees, and the upper right side direction corresponds to a direction of 45 degrees. In FIG. 14, a darker red color indicates a higher luminance of exiting light.

When viewing FIG. 14, exiting light is deflected to the lower left side area 1043 as shown in FIG. 3. Thus, even though the luminance of light exiting from the LGP 1130 is higher than the upper right side of the optical sheet 1000, luminance non-uniformity and side visibility non-uniformity may be enhanced when the exiting light is passed through the optical sheet 1000 of the present embodiment. Therefore, luminance may be uniform between the upper right side area 1045 and the lower left side area 1043 of the optical sheet 1000 as shown in FIG. 3, and side visibility conditions may be satisfied.

According to the present embodiment, front luminance and contrast ratio may be decreased compared to a case in which two sheets such as a conventional diffusion sheet and a conventional prism sheet are used. However, horizontal and vertical TCO'03 conditions may be satisfied. Therefore, in the display device 1001, the conventional three optical sheets may be replaced with one optical sheet 1000 according to the present embodiment. Moreover, considering that light transmittance of the display panel 1200 may be enhanced, decreasing amounts of the luminance and contrast ratio may be offset.

According to the optical sheet and the display device having the optical sheet in accordance with the embodiments of the present invention, the display device includes one optical sheet according to the present invention, so that optical sheets such as a plurality of diffusion sheets and a plurality of prism sheets may be omitted. The optical sheet may satisfy viewing angle characteristics such as front luminance characteristics, contrast ratio characteristics, and horizontal and vertical TCO'03 conditions. Therefore, display quality may not be decreased, and the number of the optical sheets that are used for the display device may be reduced.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. An optical sheet comprising:
a base layer including a first surface a second surface opposite the first surface, and a plurality of sides extending between the first and second surfaces, the plurality of sides including at least one longitudinal side and at least one vertical side being perpendicular to one another;
a light-condensing layer including a plurality of light-condensing portions formed on the second surface along a first direction crossing the longitudinal side and the vertical side, the light-condensing portions being extended in a second direction crossing the first direction at a angle with respect to the longitudinal side and the vertical side, a plurality of recesses being formed where the light-condensing portions meet each other; and
a plurality of light-reflecting portions being formed in the first surface in correspondence with the plurality of recesses, the centers of the light-reflecting portions being off set from the recesses along the first direction regardless of position on the first surface.

2. The optical sheet of claim 1, wherein the first direction is defined as a direction toward the upper right corner of the optical sheet from the lower left corner of the optical sheet, and light incident to the second surface is dispersed toward the lower left side of the optical sheet to be irradiated through the first surface.

3. The optical sheet of claim 1, wherein the optical sheet has a rectangular shape, the light-condensing portions and the light-reflecting portions being extended along the second direction to be formed as a stripe-type structure.

4. The optical sheet of claim 3, wherein the light-condensing portion has a lenticular shape when viewed a cross-sectional surface of the light-condensing portion cut along the first direction.

5. The optical sheet of claim 3, further comprising a concavo-convex pattern layer disposed between the first surface and the light-reflecting portions, the concavo-convex pattern layer having a plurality of protruding portions which the light-reflecting portions are formed thereon.

6. The optical sheet of claim 5, wherein at least one of the light-condensing layer and the concavo-convex pattern layer further comprises light dispersants.

7. The optical sheet of claim 3, wherein an interval distance between the recesses and the center of the light-reflecting portion is increased along the first direction.

8. The optical sheet of claim 7, wherein the line width of the light-reflecting portion is uniform.

9. The optical sheet of claim 7, wherein the line width of the light-reflecting portion is decreased along the first direction.

10. The optical sheet of claim 3, wherein an interval distance between the recesses and the center of the light-reflecting portion along the first direction is substantially uniform.

11. The optical sheet of claim 10, wherein the light-condensing portions and the light-reflecting portions are formed with substantially the same pitch along the first direction.

12. The optical sheet of claim 10, wherein an interval distance between the center of the light-condensing portion and an edge of the light-reflecting portion along the first direction is substantially uniform.

13. The optical sheet of claim 10, wherein an interval distance between the center of the light-condensing portion and an edge of the light-reflecting portion along the first direction is increased moving toward the first direction.

14. A display device comprising:
a light-guide plate (LGP) comprising a light-exiting surface, an opposite surface facing the light-exiting surface and a plurality of side surfaces connecting to the light-exiting surface and the opposite surface;
a light source disposed adjacent to at least one of the side surfaces;
an optical sheet comprising:
a base layer including a first surface, a second surface opposite the first surface, and a plurality of sides extending between the first and second surfaces, the plurality of sides including at least one longitudinal side and at least one vertical side being perpendicular to one another;
a light-condensing layer including a plurality of light-condensing portions formed on the second surface along a first direction crossing the longitudinal side and the vertical side, the light-condensing portions being extended in a second direction crossing the first direction at a angle with respect to the longitudinal side and the vertical side, a plurality of recesses being formed where the light-condensing portions meet each other; and
a plurality of light-reflecting portions being formed in the first surface in correspondence with the plurality of recesses, the centers of the light-reflecting portions being off set from the recesses along the first direction regardless of position on the first surface; and
a display panel being disposed to face the second surface of the optical sheet.

15. The display device of claim 14, wherein the first direction is defined as a direction toward the upper right corner of the optical sheet from the lower left corner of the optical sheet, and the centers of the light-reflecting portions are misaligned from the recess to the upper right side of the optical sheet regardless of position on the first surface, when viewed from the front of the display panel.

16. The display device of claim 15, wherein the light source comprises:

a lamp tube disposed adjacent to at least one of a lower side surface of the LGP corresponding to the longitudinal side and an upper side surface of the LGP facing the lower side surface;

a cold electrode disposed at a left side edge of the lamp tube; and a hot electrode disposed at a right side edge of the lamp tube.

17. The display device of claim 15, wherein the light-condensing portions and the light-reflecting portions are formed with substantially the same pitch along the first direction, and an interval distance between the recess and the center of the light-reflecting portion is uniform along the first direction.

18. The display device of claim 15, wherein the first direction and the second direction are crossed with an arrangement direction of pixels of the display panel to prevent a moiré pattern from being generated on the display panel.

19. The display device of claim 15, wherein one optical sheet is disposed between the light-exiting surface of the LGP and the display panel to enhance luminance uniformity and the front luminance of light exiting from the light-exiting surface.

20. The display device of claim 19, wherein a plurality of line prisms extended substantially in parallel with the first direction is formed on the opposite surface.

* * * * *